United States Patent
Kerschbaum et al.

(10) Patent No.: US 12,122,429 B2
(45) Date of Patent: Oct. 22, 2024

(54) VEHICLE GUIDANCE SYSTEM AND METHOD FOR TERMINATING AUTOMATED VEHICLE GUIDANCE

(71) Applicant: Bayerische Motoren Werke Aktiengesellschaft, Munich (DE)

(72) Inventors: Philipp Kerschbaum, Munich (DE); Christina Kurpiers, Moosburg (DE); Felix Lauber, Munich (DE); Julia Mejia Hernandez, Munich (DE); Frederik Platten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 247 days.

(21) Appl. No.: 17/779,388

(22) PCT Filed: Oct. 22, 2020

(86) PCT No.: PCT/EP2020/079725
§ 371 (c)(1),
(2) Date: May 24, 2022

(87) PCT Pub. No.: WO2021/110319
PCT Pub. Date: Jun. 10, 2021

(65) Prior Publication Data
US 2022/0396291 A1 Dec. 15, 2022

(30) Foreign Application Priority Data
Dec. 2, 2019 (DE) ............ 10 2019 132 577.3

(51) Int. Cl.
*B60W 60/00* (2020.01)
*B60W 50/10* (2012.01)
*B60W 50/14* (2020.01)

(52) U.S. Cl.
CPC ........ *B60W 60/0057* (2020.02); *B60W 50/10* (2013.01); *B60W 50/14* (2013.01);
(Continued)

(58) Field of Classification Search
CPC ..... B60W 2050/146; B60W 2510/202; B60W 2540/10; B60W 2540/12; B60W 2540/18;
(Continued)

(56) References Cited

U.S. PATENT DOCUMENTS

2014/0303827 A1   10/2014   Dolgov et al.
2015/0283998 A1*  10/2015   Lind ............... B60W 60/0055
                                                          701/23
(Continued)

FOREIGN PATENT DOCUMENTS

DE    10 2017 208 763 A1    11/2018
DE    10 2017 213 572 A1    2/2019
(Continued)

OTHER PUBLICATIONS

International Search Report (PCT/ISA/210) issued in PCT Application No. PCT/EP2020/079725 dated Jan. 28, 2021 with English translation (four (4) pages).
(Continued)

*Primary Examiner* — Tyler J Lee
*Assistant Examiner* — Yufeng Zhang
(74) *Attorney, Agent, or Firm* — Crowell & Moring LLP

(57) ABSTRACT

A vehicle guidance system detects when a driver of the vehicle manually intervenes in the longitudinal and/or transverse guidance of the vehicle while the vehicle is being operated in an automated driving mode. The vehicle guidance system outputs an indication to the driver via a user interface of the vehicle prompting the driver to take over the longitudinal and/or transverse guidance of the vehicle. The vehicle guidance system also continues to provide the lon-
(Continued)

gitudinal and/or lateral guidance of the vehicle in at least a partially automated manner for a takeover period of time and/or for a takeover distance.

18 Claims, 1 Drawing Sheet

(52) U.S. Cl.
CPC ... *B60W 60/0053* (2020.02); *B60W 2050/146* (2013.01); *B60W 2510/202* (2013.01); *B60W 2540/10* (2013.01); *B60W 2540/12* (2013.01); *B60W 2540/215* (2020.02); *B60W 2540/223* (2020.02)

(58) Field of Classification Search
CPC ..... B60W 2540/215; B60W 2540/223; B60W 50/087; B60W 50/10; B60W 50/14; B60W 60/0053; B60W 60/0054; B60W 60/0057; B62D 1/286
See application file for complete search history.

(56) References Cited

U.S. PATENT DOCUMENTS

| | | | |
|---|---|---|---|
| 2018/0150074 A1* | 5/2018 | Hashimoto | ....... B60W 60/0053 |
| 2019/0009793 A1 | 1/2019 | Wulf et al. | |
| 2019/0077415 A1* | 3/2019 | Nagasawa | ............. B60W 10/04 |
| 2019/0126925 A1 | 5/2019 | Ryne et al. | |
| 2019/0291747 A1 | 9/2019 | Chiba | |
| 2019/0315374 A1* | 10/2019 | Oh | .................. B60W 30/18163 |
| 2020/0086907 A1 | 3/2020 | Breisinger et al. | |
| 2021/0146943 A1* | 5/2021 | Oniwa | .................... B60R 21/00 |

FOREIGN PATENT DOCUMENTS

| | | |
|---|---|---|
| DE | 10 2018 126 689 A1 | 5/2019 |
| EP | 3 336 643 A1 | 6/2018 |
| WO | WO 2017/102188 A1 | 6/2017 |

OTHER PUBLICATIONS

German-language Written Opinion (PCT/ISA/237) issued in PCT Application No. PCT/EP2020/079725 dated Jan. 28, 2021 (seven (7) pages).

German-language Search Report issued in German Application No. 10 2019 132 577.3 dated Sep. 8, 2020 with partial English translation (12 pages).

* cited by examiner

VEHICLE GUIDANCE SYSTEM AND METHOD FOR TERMINATING AUTOMATED VEHICLE GUIDANCE

FIELD

The invention relates to a vehicle which is designed for automated longitudinal and lateral guidance. In particular, the invention relates to a vehicle guidance system and to a corresponding method which are designed to assist the driver of a vehicle in terminating the automated longitudinal and lateral guidance.

BACKGROUND AND SUMMARY

A vehicle may be designed for highly automated driving, which makes it possible for the driver of the vehicle to turn away from the driving task during the journey and deal with other things. In this case, the vehicle should be designed such that the driver can take over the driving task at any time, if necessary or desired. In particular, it should be possible for the driver to manually take over the driving task by means of an intervention on a manual control means of the vehicle, for example on a steering wheel.

The present document deals with the technical problem of making it possible to safely transfer the driving task from the vehicle to the driver of the vehicle if the automated longitudinal and lateral guidance of the vehicle is terminated in a manner prompted by the driver of a vehicle, possibly inadvertently.

The object is achieved by the present disclosure. Advantageous embodiments are also described in the present disclosure. It is pointed out that additional features of a patent claim dependent on an independent patent claim may form, without the features of the independent patent claim or only in combination with a subset of the features of the independent patent claim, a separate invention which is independent of the combination of all of the features of the independent patent claim and can be made the subject matter of an independent claim, a divisional application or a subsequent application. This applies in the same manner to technical teachings which are described in the description and can form an invention independent of the features of the independent patent claims.

One aspect describes a vehicle guidance system or a driving system for operating a vehicle (in particular a (multitrack) motor vehicle) in an automated driving mode. In other words, a driving system for driving a vehicle in an automated manner in an automated driving mode with automated vehicle guidance is described. The automated driving mode may be such that the vehicle is longitudinally and laterally guided in an automated manner in the automated driving mode. In particular, the vehicle guidance system may be designed to longitudinally and laterally guide the vehicle in an automated manner in the automated driving mode according to SAE level 3 or higher, in particular according to SAE level 3 or according to SAE level 4.

The vehicle guidance system may be configured to detect a manual intervention by a driver of the vehicle in the longitudinal and/or lateral guidance of the vehicle (in particular at a detection time) while the vehicle is being operated in the automated driving mode. In other words, it is possible to detect that there is intervention in the longitudinal and/or lateral guidance of the vehicle at a particular time (that is to say the detection time) by virtue of a manual intervention on a control means of the vehicle (in particular on a steering means or a steering wheel and/or on a braking means or a brake pedal).

The manual intervention may comprise, for example, an intervention on a steering means, in particular on the steering wheel, for steering the vehicle. In particular, the manual intervention may comprise an intervention on the steering means, without the steering means being touched by at least one hand in the process. The touching of the steering wheel may possibly have been caused by a foot or leg of the driver of the vehicle. The sensor data from one or more contact sensors on the steering means can be taken as a basis, for example, for detecting when the steering means is not touched by a hand. The steering means may have, for example, at least one contact sensor each hand of the driver in each case. The sensor data from the contact sensor can be taken as a basis, for example, for detecting whether the driver touches or grips the steering wheel with one hand (or does not touch or grip the steering wheel).

Alternatively or additionally, the manual intervention may comprise an intervention on the brake pedal for decelerating the vehicle. For example, it is possible to detect that the brake pedal has been moved (for example by inadvertent touch by a foot of the driver).

Alternatively or additionally, the manual intervention may have been effected on a control means which is not decoupled from the longitudinal and/or lateral guidance of the vehicle during the automated driving mode (with the result that touching of the control means directly causes an intervention in the longitudinal and/or lateral guidance of the vehicle). This may be the case, in particular, for the steering means (in particular the steering wheel) and/or the brake pedal.

The manual intervention may have possibly been inadvertently caused by the driver. In particular, the driver may possibly have inadvertently bumped against a manual control means (for example against the steering wheel or the brake pedal) of the vehicle while the vehicle is being operated in the automated driving mode. In such a case too, it should be possible to reliably transfer the driving task from the vehicle to the driver of the vehicle.

The vehicle guidance system may be configured to output an (acoustic, optical and/or haptic) notification to the driver of the vehicle via a user interface of the vehicle (for example on a screen and/or using a loudspeaker). The notification may be designed to prompt the driver of the vehicle to (at least partially or completely) manually take over the longitudinal and/or lateral guidance of the vehicle. Alternatively or additionally, the notification may be designed to inform the driver of the vehicle that, on account of the manual intervention (in particular since the detection time), the responsibility for the longitudinal and/or lateral guidance of the vehicle lies with the driver of the vehicle. The driver can therefore be clearly informed, using at least one notification, that the driver must at least partially manually guide the vehicle since the detection time at which the manual intervention was effected and/or at which the manual intervention was detected. The notification therefore makes it possible to clearly transfer the responsibility for the driving task to the driver of the vehicle.

Furthermore, the vehicle guidance system may be configured to nevertheless (even though the responsibility for the driving task lies with the driver and no longer with the vehicle) at least partially or completely continue the automated driving mode (in particular from the detection time on). In other words, the automated longitudinal and/or lateral guidance of the vehicle can nevertheless be (at least partially or completely) continued. For example, the vehicle may be longitudinally and/or laterally guided with a degree of automation (which is reduced in comparison with the automated driving mode) (for example according to SAE level 2).

The at least partial or complete continuation of the automated driving mode may possibly be limited in this case to a particular takeover period (for example between 5 and 15 seconds) and/or to a particular takeover distance (from the detection time on). Therefore, even though the responsibility for guiding the vehicle lies with the driver, it is still possible to provide (possibly complete) automated assistance which is as comprehensive as possible when guiding the vehicle. Even in the case of a manual intervention which was inadvertently caused by the driver of the vehicle, it is thus possible to safely transfer the driving task to the driver of the vehicle.

In particular, the vehicle guidance system may be designed to shift or delay the actual termination of the automated driving mode by at most the duration of the takeover period and/or the length of the takeover distance in order to make it possible for the driver of the vehicle, also on account of an inadvertent manual intervention, to take over the driving task in a safe and convenient manner.

The vehicle guidance system may be configured to transfer the vehicle to a safe state in an automated manner after expiry of the takeover period and/or after driving through the takeover distance. For example, the vehicle can be transferred to the edge of a road and/or to a standstill in an automated manner. Safe operation of the vehicle can therefore be effected even when the driver of the vehicle does not take over the driving task.

The vehicle guidance system may be configured to operate the vehicle (starting from a full state of the automated driving mode) in an intermediate state in response to the manual intervention being detected (that is to say from the detection time on). The intermediate state may be retained, for example, for the duration of the takeover period (or the takeover distance) and/or until the driving task is ultimately taken over by the driver (depending on what previously takes place). In the intermediate state, the vehicle can still be (at least partially or completely) operated in the automated driving mode. On the other hand, the intermediate state may be designed to prepare the driver of the vehicle for a driving mode with the reduced degree of automation, in particular for the at least partial or complete manual guidance of the vehicle. The full state of the automated driving mode and the intermediate state of the automated driving mode can therefore differ, in particular, in terms of the information output via the user interface (for example on a screen) of the vehicle.

The vehicle guidance system may be configured to output, in particular display, via the user interface of the vehicle, in the intermediate state, information which is output in the driving mode with the reduced degree of automation (in particular in the manual driving mode) but is not output in the normal state of the automated driving mode (before the transfer to the intermediate state). The information may comprise, for example: information relating to the (engaged) gear of the transmission of the vehicle; information relating to the speed of the drive motor of the vehicle; and/or information relating to the driving speed of the vehicle.

The intermediate state can therefore additionally inform the driver of the vehicle (for example by means of a display in the combination instrument of the vehicle) of the fact that the responsibility for the driving task lies with the driver of the vehicle (and no longer with the vehicle itself). An increased level of attention of the driver of the vehicle can be effected by the intermediate state. Furthermore, the driver of the vehicle may be forced or prompted to at least partially manually guide the vehicle by the intermediate state.

The vehicle guidance system may be configured, in particular during the takeover period and/or the takeover distance, to check whether the detected manual intervention is confirmed by a second (operating) action of the driver. In this case, the second (operating) action may comprise or be an (operating) action which is aimed at the manual longitudinal and/or lateral guidance of the vehicle.

The second action (for confirming the manual intervention) may comprise actuating and/or touching a manual control means of the vehicle which is designed and/or provided for the manual longitudinal and/or lateral guidance of the vehicle by the driver. In particular, the second action may comprise an action which should be carried out anyway and/or necessarily by the driver when the driver wishes to at least partially or completely manually longitudinally and/or laterally guide the vehicle or longitudinally and/or laterally guides the vehicle after termination of the automated driving mode.

The second action may comprise, for example: touching the steering wheel of the vehicle with both hands; causing a steering torque on a manual steering means, in particular on the steering wheel, of the vehicle; causing a deceleration of the vehicle by the driver of the vehicle, in particular by actuating the brake pedal of the vehicle; and/or causing an acceleration of the vehicle by the driver of the vehicle, in particular by actuating the accelerator pedal of the vehicle.

The checking in order to determine whether a second action of the driver, which is aimed at the takeover of the driving task by the driver of the vehicle, is effected makes it possible for the vehicle guidance system to reliably determine whether the manual intervention has been inadvertently effected or whether the manual intervention was an intentional intervention for the takeover of the driving task by the driver. The checking can therefore make it possible for the driver of the vehicle to terminate the automated driving mode in a particularly convenient, intuitive and safe manner.

The vehicle guidance system may be configured to (completely) terminate the automated driving mode (with the result that the driver must guide the vehicle in a completely manual manner) if and/or as soon as it is determined that the detected manual intervention is confirmed by a second action of the driver. Alternatively or additionally, the vehicle guidance system may be configured to at least partially continue the automated driving mode if and/or as long as (possibly within the takeover period and/or the takeover distance) it is determined that the detected manual intervention has not (yet) been confirmed by a second action of the driver. The driving task can therefore be transferred to the driver of the vehicle in a convenient and safe manner.

The second action may be such that the second action is effected on a different control means for the manual longitudinal and/or lateral guidance of the vehicle than the manual intervention. Alternatively or additionally, the second action may be such that the second action comprises a different form of actuation and/or touching of a control means for the manual longitudinal and/or lateral guidance of the vehicle than the manual intervention. In other words, the second action which is expected by the vehicle guidance system for confirmation of the manual intervention may be at least partially or completely independent of the manual intervention. It is therefore possible to determine in a particularly reliable manner whether the manual intervention was effected inadvertently or intentionally (for taking over the driving task).

The vehicle guidance system may therefore be configured, during the takeover period, to check whether the driver of the vehicle actually takes over the longitudinal and/or lateral guidance of the vehicle. This may be effected, for example, by checking whether a second action of the driver, which is used to confirm the manual intervention, is effected.

Furthermore, the vehicle guidance system may be configured to output, via the user interface of the vehicle, one or more (acoustic, optical and/or haptic) warnings to the driver of the vehicle which are aimed at prompting the driver of the vehicle to take over the longitudinal and/or lateral guidance of the vehicle if and/or as long as it is determined that the driver of the vehicle does not (actually) take over the longitudinal and/or lateral guidance of the vehicle. For example, a so-called takeover request (TOR) may be output as the warning.

Furthermore, the vehicle guidance system may be configured to terminate the output of the one or more warnings if and/or as soon as it is determined that the driver of the vehicle takes over the longitudinal and/or lateral guidance of the vehicle (for example as soon as a second action confirming the manual intervention by the driver of the vehicle is detected).

The output of one or more warnings makes it possible to reliably cause the driver to take over the driving task even when there is an inadvertent manual intervention within the takeover period and/or the takeover distance.

A further aspect describes a (road) motor vehicle (in particular an automobile or a truck or a bus) comprising the control unit described in this document and/or the vehicle guidance system described in this document.

A further aspect describes a method for operating a vehicle in an automated driving mode in which the vehicle is longitudinally and laterally guided in an automated manner. The method comprises detecting, in particular at a detection time, a manual intervention by a driver of the vehicle in the longitudinal and/or lateral guidance of the vehicle while the vehicle is being operated in the automated driving mode. The method also comprises (in response to the detection) outputting a notification to the driver of the vehicle via a user interface of the vehicle. The notification may be aimed at informing the driver of the vehicle that the responsibility for guiding the vehicle (in particular since the detection time) lies with the driver. Alternatively or additionally, the notification may be aimed at informing the driver of the vehicle that, on account of the manual intervention, since the detection time, the responsibility for the longitudinal and/or lateral guidance of the vehicle lies with the driver of the vehicle. Alternatively or additionally, the notification may be aimed at prompting the driver to (immediately) take over the vehicle guidance. The method also comprises continuing at least part of the automated driving mode or at least part of the automated longitudinal and/or lateral guidance of the vehicle for a (time-limited) takeover period and/or for a (distance-limited) takeover distance.

A further aspect describes a software (SW) program. The SW program may be configured to be executed on a processor (for example on at least one control device of a vehicle) and to thereby carry out the method described in this document.

A further aspect describes a storage medium. The storage medium may comprise a SW program which is configured to be executed on a processor and to thereby carry out the method described in this document.

Within the scope of the document, the term "automated driving" may be understood as meaning driving with automated longitudinal or lateral guidance or autonomous driving with automated longitudinal and lateral guidance. Automated driving may involve, for example, driving on the freeway for a relatively long time or time-limited driving when parking or maneuvering. The term "automated driving" comprises automated driving with any desired degree of automation. Exemplary degrees of automation are assisted, partially automated, highly automated or fully automated driving. These degrees of automation were defined by the Federal Highway Research Institute (BASt) (see BASt publication "Forschung kompakt", issue November 2012). During assisted driving, the driver permanently carries out the longitudinal or lateral guidance, while the system performs the respective other function within certain limits. During partially automated driving, the system takes over the longitudinal and lateral guidance for a certain period and/or in specific situations, in which case the driver must permanently monitor the system, as during assisted driving. In highly automated driving, the system takes over the longitudinal and lateral guidance for a certain period without the driver having to permanently monitor the system; however, the driver must be able to take over the vehicle guidance in a certain time. During fully automated driving, the system can automatically manage the driving in all situations for a specific application; a driver is no longer required for this application. The four degrees of automation mentioned above correspond to SAE levels 1 to 4 of the SAE J3016 standard (SAE—Society of Automotive Engineering). For example, highly automated driving corresponds to level 3 of the SAE J3016 standard. Furthermore, in SAE J3016, SAE level 5 is also provided as the highest degree of automation which is not included in the definition by the BASt. SAE level 5 corresponds to driverless driving in which the system can automatically manage all situations like a human driver during the entire journey; a driver is generally no longer required. The aspects described in this document relate, in particular, to a vehicle which can be operated in an automated driving mode according to SAE level 3 or higher and which can also be operated in a driving mode with a reduced degree of automation, for example according to SAE level 2 or lower.

It should be noted that the methods, apparatuses and systems described in this document can be used both alone and in combination with other methods, apparatuses and systems described in this document. Furthermore, any aspects of the methods, apparatuses and systems described in this document can be combined with one another in various ways. In particular, the features of the claims can be combined with one another in various ways.

The invention is described in more detail below on the basis of exemplary embodiments.

DETAILED DESCRIPTION

Figure 1A:
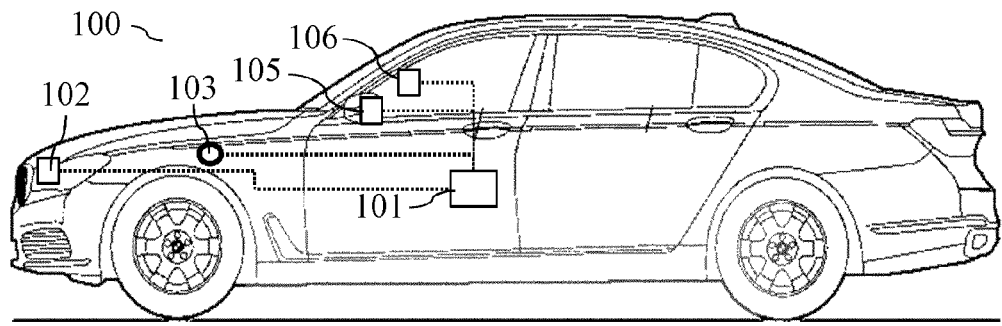
FIG. 1a shows exemplary components of a vehicle.

As explained at the outset, the present document deals with the safe operation of a vehicle when terminating the automated vehicle guidance. In this context, FIG. 1a shows exemplary components of a vehicle 100, in particular a motor vehicle. The vehicle 100 comprises one or more environmental sensors 102 which are configured to capture sensor data (also referred to as environmental data in this document) relating to the environment of the vehicle 100. Exemplary environmental sensors 102 are a camera, a radar sensor, a lidar sensor, an ultrasonic sensor, etc.

The vehicle 100 also comprises one or more longitudinal and/or lateral guidance actuators 103 (for example a drive motor, a braking apparatus, a steering apparatus, etc.) which are configured to longitudinally and/or laterally guide the vehicle 100 in an automatic or automated manner. A control unit 101 of the vehicle 100 may be configured to operate the one or more longitudinal and/or lateral guidance actuators 103 of the vehicle on the basis of the environmental data in order to longitudinally and/or laterally guide the vehicle 100 in an automated manner in an automated driving mode (in particular according to SAE level 3 or higher).

The vehicle 100 comprises one or more manual control means 105 which make it possible for the driver of the vehicle 100 to make manual control inputs with respect to the longitudinal and/or lateral guidance of the vehicle 100. Exemplary control means 105 are: a steering means, in particular a steering wheel; a brake pedal; and/or an accelerator pedal. The control unit 101 may be configured (in particular if the vehicle 100 is being operated in a manual driving mode) to detect a manual control input on a manual control means 105 of the vehicle. The control unit 101 may also be configured to operate the one or more longitudinal and/or lateral guidance actuators 102 of the vehicle 100 on the basis of the manual control input, in particular in order to make it possible for the driver of the vehicle 100 to manually longitudinally and/or laterally guide the vehicle 100.

It may be possible to intervene directly in the longitudinal and/or lateral guidance of the vehicle 100 by actuating a control means 105. For example, actuation of the steering means, in particular the steering wheel, typically results directly in a change in the steering angle of the vehicle 100 (even when the vehicle 100 is being operated in the automated driving mode). Furthermore, actuation of the brake pedal typically results directly in braking of the vehicle 100 (even when the vehicle 100 is being operated in the automated driving mode).

The vehicle 100 may comprise a user interface 106 which enables interaction between the vehicle 100 and the driver of the vehicle 100. The user interface 106 may comprise one or more operating elements (for example a button, a rotary knob, etc.) and/or one or more output elements (for example a screen, a lighting element, a loudspeaker, etc.). The control unit 101 may be configured to output an optical, haptic and/or acoustic notification to the driver of the vehicle 100 via the user interface 106.

It may be the case that the driver of the vehicle 100, during operation of the automated driving mode, inadvertently pushes a control means 105 (for example the steering wheel, the brake pedal and/or the accelerator pedal) of the vehicle 100 and/or an operating element of the user interface 106 that is associated with the deactivation of the automated driving mode. In other words, it may be the case that, during operation of the automated driving mode, the driver of the vehicle 100 inadvertently and/or unintentionally performs an action which is aimed at terminating the automated driving mode and/or which results in intervention in the vehicle guidance. It is therefore possible to detect an action which results in the longitudinal and/or lateral guidance of the vehicle 100, which is effected by the automated driving mode, being overridden by the (possibly unintentional) action or by the (possibly unintentional) intervention by the driver.

The control unit 101 of the vehicle 100 may be configured, in response to the detected action of the driver, to output, via the user interface 106, an acoustic, haptic and/or optical notification to the driver of the vehicle 100 informing the driver of the vehicle 100 that, on account of the detected action of the driver, the responsibility for guiding the vehicle 100 has been transferred to the driver. In other words, a notification can be used to inform the driver that the driving task should be immediately manually performed by the driver of the vehicle 100 (and no longer by the vehicle 100 itself).

The control unit 101 may also be configured to continue at least part of the automated vehicle guidance, in particular when it is detected that the action was unintentional and/or when it is detected that the driver of the vehicle 100 does not take over the driving task. For example, the control unit 101 may be configured to continue to operate the vehicle 100 in the automated driving mode for a particular takeover period (for example between 5 and 15 seconds). It should be pointed out that the statements described in this document with respect to a takeover period accordingly apply to a particular takeover distance.

If it is detected that the driver of the vehicle 100 does not react to the notification to take over the driving task, it is possible (for example after expiry of the takeover period) to cause the vehicle 100 to be transferred to a safe state. For example, the vehicle 100 may be automatically transferred to the edge of the road and/or to a standstill for this purpose.

Figure 1B:
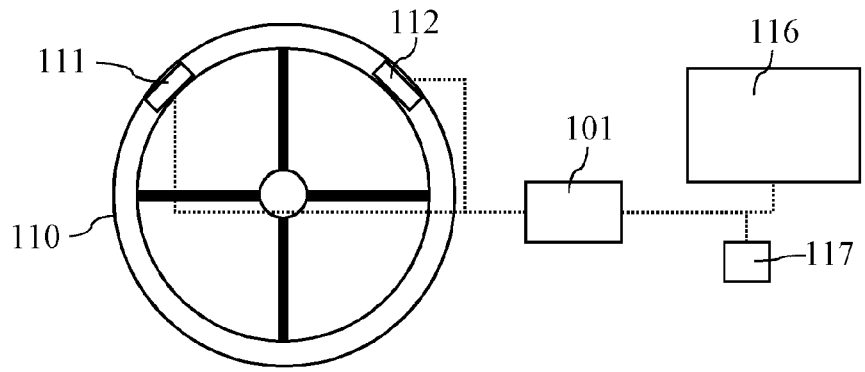
FIG. 1b shows an exemplary steering wheel of a vehicle.

FIG. 1*b* shows exemplary components of a vehicle 100 at the driver's position in the vehicle 100. In particular, FIG. 1*b* shows a steering wheel 110 as an exemplary manual control means 105 which makes it possible for the driver of the vehicle 100 to manually steer the vehicle 100. A left-hand contact sensor 111, which is configured to detect whether the driver of the vehicle 100 is touching the steering wheel 110 with his left hand, and a right-hand contact sensor 112, which is configured to detect whether the driver of the vehicle 100 is touching the steering wheel 110 with his right hand, may be arranged on the steering wheel 110. In particular, the control unit 101 may be configured to determine, on the basis of the sensor data from the contact sensors 111, 112 of the steering wheel 110, whether or not the driver of the vehicle 100 is touching the steering wheel 110 with both hands.

FIG. 1*b* also shows a screen 116 and a loudspeaker 117 as exemplary components of the user interface 106.

As explained further above, the brake pedal and/or the steering wheel 110 is/are typically not deactivated during the highly automated driving mode for reasons of safety. This may result in the driver of the vehicle 100 inadvertently causing a manual intervention in the vehicle guidance during the highly automated driving mode as a result of touching of the brake pedal and/or the steering wheel 110.

The control unit 101 may be configured, in response to a detected manual intervention, to transfer the vehicle 100 to an intermediate state in which the responsibility for the driving task lies with the driver, but in which the vehicle 100 still provides the driver with assistance which is as extensive as possible when guiding the vehicle, in particular as a result of automated interventions in the vehicle guidance. At the same time, one or more clear notifications via the user interface 106 can be used to (aurally, visually and/or haptically) advise the driver that he must again himself take over the driving task. The one or more notifications may be output, in particular, when it is not clearly detected that the driver even actually wanted to take over or actually takes over the driving task.

The control unit 101 may be configured to check whether or not the driver of the vehicle 100 confirms the first action (in particular the manual intervention in the vehicle guidance) by means of a second action. In particular, it is possible to check whether the driver of the vehicle carries out a second action which is aimed at actually taking over the driving task. If the confirming second action is detected, the remaining part of the automated driving mode may also be terminated in order to make it possible for the driver of the vehicle 100 to guide the vehicle 100 in a completely manual manner.

Figure 2:
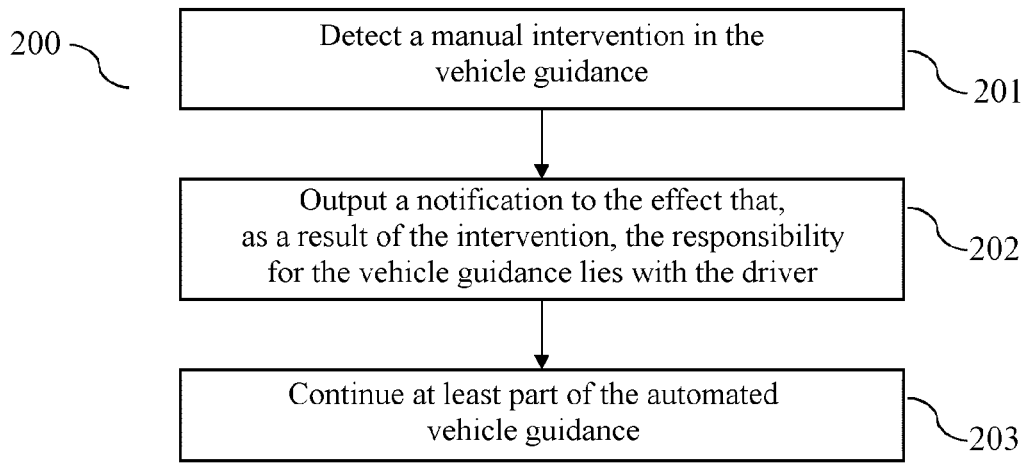
FIG. 2 shows a flowchart of an exemplary method for terminating the automated vehicle guidance of a vehicle.

FIG. 2 shows a flowchart of an exemplary (computer-implemented) method 200 for operating a vehicle 100 in an automated driving mode in which the vehicle 100 is longitudinally and laterally guided in an automated manner (in particular according to SAE level 3 or higher). The method 200 may be carried out by a control unit and/or by a vehicle guidance system 101.

The method 200 comprises detecting 201, in particular at a detection time, a manual intervention by a driver of the vehicle 100 in the longitudinal and/or lateral guidance of the vehicle 100 while the vehicle 100 is being operated in the automated driving mode. In particular, it is possible to detect that a steering torque has been effected via the steering means, in particular via the steering wheel 110, of the vehicle 100 and/or that a braking torque has been effected via the brake pedal. In this case, the manual intervention may have been effected or may be detected at a time which is referred to as the detection time in this document.

The method 200 also comprises, in response to the detection 201, outputting 202 a notification to the driver of the vehicle 100 via a user interface 106 of the vehicle 100. The notification may be aimed at prompting the driver of the vehicle 100 to (at least partially or completely) take over the longitudinal and/or lateral guidance of the vehicle 100. Alternatively or additionally, the notification may be aimed at informing the driver of the vehicle 100 that, on account of the manual intervention, since the detection time, the responsibility for the longitudinal and/or lateral guidance of the vehicle 100 lies with the driver of the vehicle 100. In other words, the driver of the vehicle 100 may be advised that the responsibility for the vehicle guidance since the detection time lies with the driver himself. In this case, the notification may comprise one or more acoustic, haptic and/or optical elements. The output of the notification may be used to prompt the driver (in particular when the manual intervention has been inadvertently effected) to take over the manual vehicle guidance as promptly as possible.

The method 200 also comprises continuing 203 at least part of the automated driving mode (from the detection time on), in particular for a time-limited takeover period (with a defined duration of 5 to 15 seconds, for example) and/or for a limited takeover distance (with a defined length of 50 to 200 meters, for example). The driver can therefore continue to be assisted in the driving task (at least for a limited takeover period or for a limited takeover distance) even though the responsibility for the vehicle guidance lies (fully) with the driver. Safe and reliable transfer to the driver can therefore be carried out even in the case of an inadvertent manual intervention in the vehicle guidance.

The present invention is not restricted to the exemplary embodiments shown. In particular, it should be noted that the description and the figures are intended to illustrate, only by way of example, the principle of the proposed methods, apparatuses and systems.

What is claimed is:

1. A vehicle guidance system for operating a vehicle in an automated driving mode in which the vehicle is longitudinally and laterally guided in an automated manner, wherein the vehicle guidance system is configured to:
   detect a manual intervention by a driver of the vehicle in the longitudinal and/or lateral guidance of the vehicle while the vehicle is being operated in the automated driving mode;
   responsively output a notification to the driver of the vehicle via a user interface of the vehicle prompting the driver of the vehicle to take over the longitudinal and/or lateral guidance of the vehicle;
   continue to provide at least a part of the longitudinal and/or lateral guidance of the vehicle for a takeover period of time and/or for a takeover distance; and
   transfer the vehicle to a safe state in an automated manner after expiration of the takeover period and/or after driving through the takeover distance.

2. The vehicle guidance system according to claim 1, wherein the vehicle guidance system is configured to:
   during the takeover period of time and/or the takeover distance:
      check whether the detected manual intervention is confirmed by a second action of the driver involving manual longitudinal and/or lateral guidance of the vehicle; and
      terminate the automated driving mode in response to determining that the detected manual intervention is confirmed by the second action of the driver.

3. The vehicle guidance system according to claim 2, wherein, at least one of:
   the second action is effected on a different control device for the manual longitudinal and/or lateral guidance of the vehicle than the manual intervention; or
   the second action comprises a different form of actuation and/or touching of a control device for controlling the manual longitudinal and/or lateral guidance of the vehicle than the manual intervention.

4. The vehicle guidance system according to claim 2, wherein the second action comprises at least one of:
   touching a steering wheel of the vehicle with both hands;
   causing a steering torque on the steering wheel;
   causing a deceleration of the vehicle by the driver of the vehicle actuating a brake pedal of the vehicle; or
   causing an acceleration of the vehicle by the driver of the vehicle by actuating an accelerator pedal of the vehicle.

5. The vehicle guidance system according to claim 1, wherein the manual intervention comprises at least one of:
   an intervention on a steering wheel for steering the vehicle;
   an intervention on the steering wheel without the steering wheel being touched by at least one hand in the process; or
   an intervention on a brake pedal for decelerating the vehicle.

6. The vehicle guidance system according to claim 1, wherein the vehicle guidance system is configured to:
   during the takeover period of time and/or the takeover distance:
      determine whether the driver of the vehicle takes over the longitudinal and/or lateral guidance of the vehicle; and output, via the user interface, one or more warnings to the driver to prompt the driver to take over the longitudinal and/or lateral guidance of the vehicle in response to determining that the driver does not take over the longitudinal and/or lateral guidance of the vehicle.

7. The vehicle guidance system according to claim 6, wherein the vehicle guidance system is configured to terminate the output of the one or more warnings in response to determining that the driver of the vehicle takes over the longitudinal and/or lateral guidance of the vehicle.

8. The vehicle guidance system according to claim 1, wherein the vehicle guidance system is configured to longitudinally and laterally guide the vehicle in an automated manner in the automated driving mode according to SAE level 3 or higher.

9. The vehicle guidance system according to claim 1, wherein the vehicle guidance system is configured to:
transfer the vehicle to an intermediate state, starting from a full state of the automated driving mode, in response to detecting the manual intervention, wherein the intermediate state and a full state of the automated driving mode differ in terms of a display of information via the user interface; and
display, via the user interface, in the intermediate state, information that is displayed in a manual driving mode and is not output in the automated driving mode, wherein the information comprises at least one of:
information relating to a gear of a transmission of the vehicle;
information relating to a speed of a drive motor of the vehicle; or
information relating to a driving speed of the vehicle.

10. The vehicle guidance system according to claim 1, wherein the vehicle guidance system is configured to:
detect the manual intervention by the driver at a detection time; and
continue to provide at least a part of the longitudinal and/or lateral guidance of the vehicle for a takeover period of time and/or for a takeover distance that begins at the detection time.

11. The vehicle guidance system according to claim 1, wherein the notification comprises information for the driver that, on account of the manual intervention and since a detection time at which the manual intervention was detected, the responsibility for the longitudinal and/or lateral guidance of the vehicle lies with the driver.

12. The vehicle guidance system according to claim 1, wherein the vehicle guidance system is configured to at least one of:
continue the automated driving mode for the takeover period of time and/or the takeover distance; or
longitudinally and/or laterally guide the vehicle with a degree of automation which is reduced in comparison with the automated driving mode.

13. A method for operating a vehicle, the method comprising:
operating the vehicle in an automated driving mode in which the vehicle is longitudinally and laterally guided in an automated manner;
detecting a manual intervention by a driver of the vehicle in the longitudinal and/or lateral guidance of the vehicle while the vehicle is being operated in the automated driving mode;
responsively outputting a notification to the driver of the vehicle via a user interface of the vehicle prompting the driver to take over the longitudinal and/or lateral guidance of the vehicle;
continuing to provide at least a part of the longitudinal and/or lateral guidance of the vehicle for a takeover period of time and/or for a takeover distance; and
transferring the vehicle to a safe state in an automated manner after expiration of the takeover period and/or after driving through the takeover distance.

14. The method according to claim 13, further comprising:
during the takeover period of time and/or the takeover distance:
checking whether the detected manual intervention is confirmed by a second action of the driver involving manual longitudinal and/or lateral guidance of the vehicle; and
terminating the automated driving mode in response to determining that the detected manual intervention is confirmed by the second action of the driver.

15. The method according to claim 14, wherein checking whether the detected manual intervention is confirmed by the second action of the driver involving the manual longitudinal and/or lateral guidance of the vehicle further comprises at least one of:
determining that the second action is effected on a different control device for the manual longitudinal and/or lateral guidance of the vehicle than the manual intervention; or
determining that the second action comprises a different form of actuation or touching of a control device for controlling the manual longitudinal and/or lateral guidance of the vehicle than the manual intervention.

16. The method according to claim 13, further comprising:
during the takeover period of time and/or the takeover distance:
determining whether the driver of the vehicle takes over the longitudinal and/or lateral guidance of the vehicle; and
outputting, via the user interface, one or more warnings to the driver to prompt the driver to take over the longitudinal and/or lateral guidance of the vehicle in response to determining that the driver does not take over the longitudinal and/or lateral guidance of the vehicle.

17. The method according to claim 16, further comprising:
terminating the output of the one or more warnings in response to determining that the driver of the vehicle takes over the longitudinal and/or lateral guidance of the vehicle.

18. The method according to claim 13, further comprising:
transferring the vehicle to an intermediate state, starting from a full state of the automated driving mode, in response to detecting the manual intervention, wherein the intermediate state and a full state of the automated driving mode differ in terms of a display of information via the user interface; and
displaying, via the user interface, in the intermediate state, information that is displayed in a manual driving mode and is not output in the automated driving mode, wherein the information comprises at least one of:
information relating to a gear of a transmission of the vehicle;

information relating to a speed of a drive motor of the vehicle; or information relating to a driving speed of the vehicle.

\* \* \* \* \*